United States Patent Office 3,401,880
Patented Sept. 17, 1968

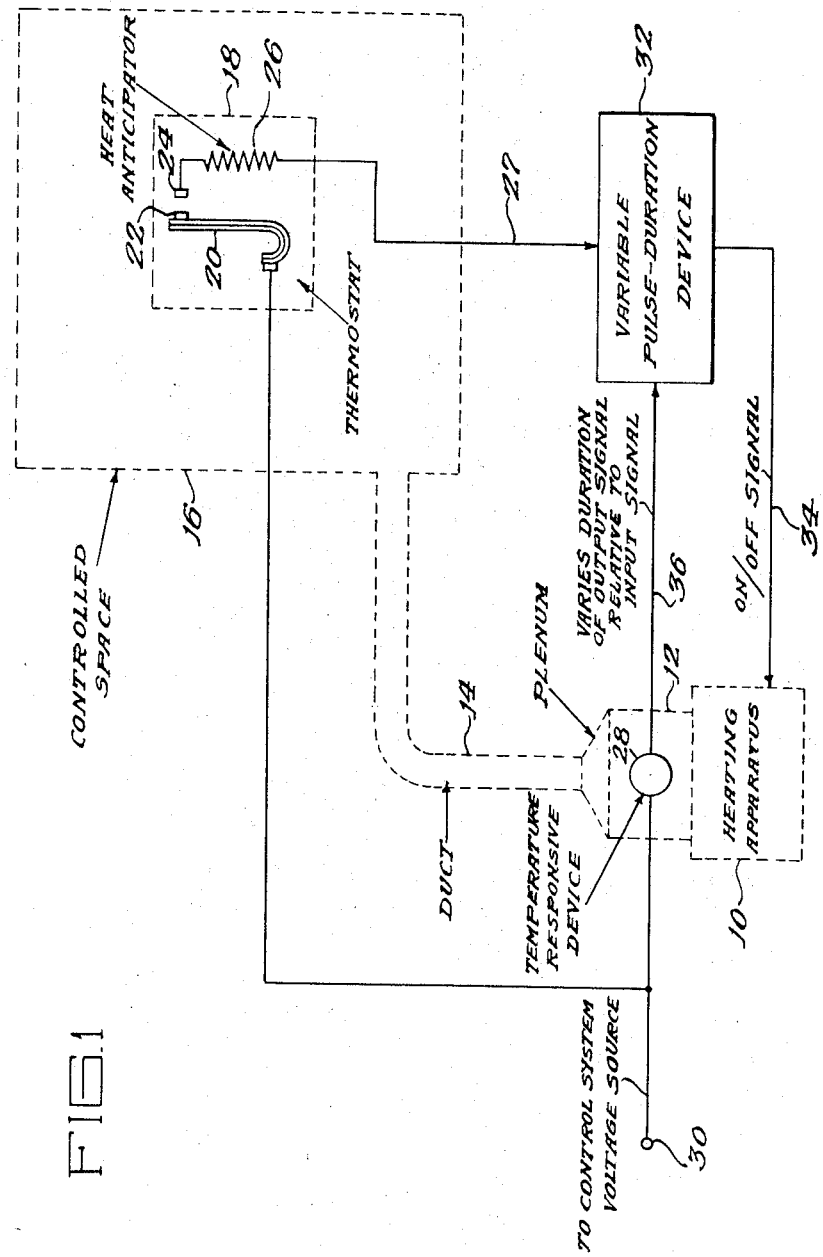

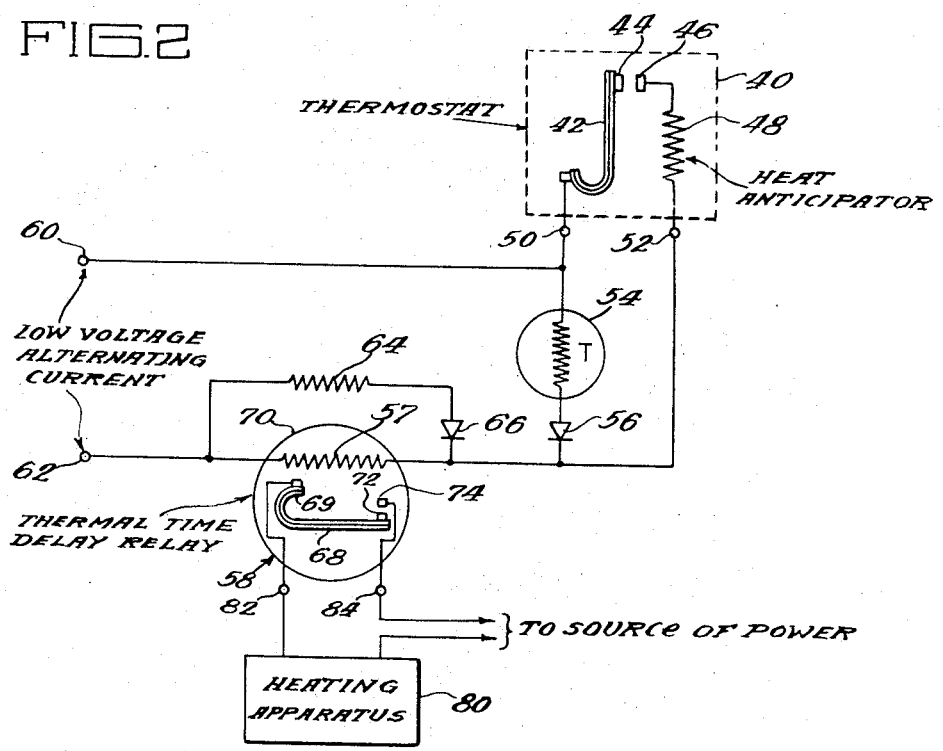
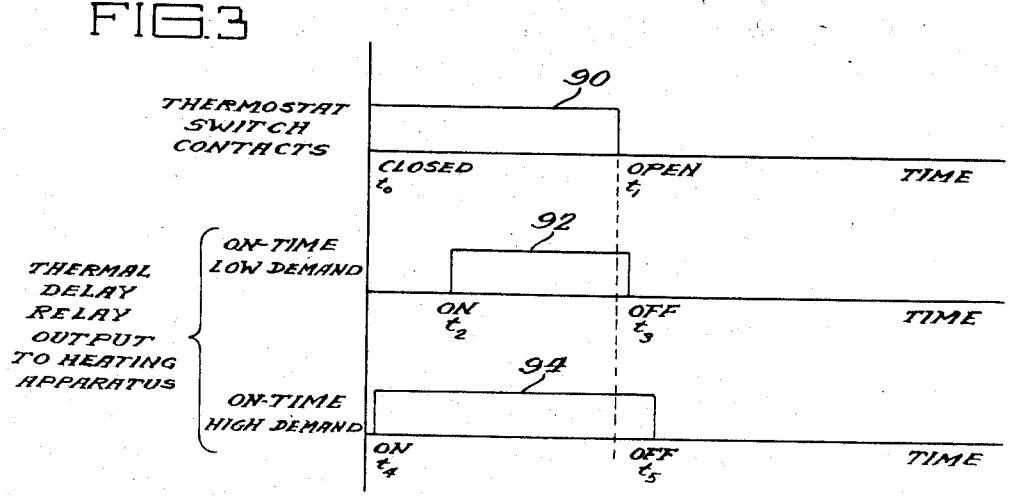

3,401,880
COMPENSATED TEMPERATURE
CONTROL SYSTEM
James A. Verden, 9152 Knight Ave.,
Des Plaines, Ill. 60016
Filed Jan. 9, 1967, Ser. No. 608,204
10 Claims. (Cl. 236—68)

ABSTRACT OF THE DISCLOSURE

Compensation is provided for the normal calibration-change of thermostatic temperature-control systems of the type used in household heating, wherein the closing-temperature of the thermostat is affected by the time since the last previous operation. The magnitude of the average heat-transfer demand is independently sensed and employed to vary the relation between the on-time of each cycle of operation of the heat-input device and the corresponding closed-contact time of the thermostatic switch.

---

This invention relates to temperature controls and their method of operation, and more particularly to controls of the type using a thermostatic switch of the kind commonly used in residential, commercial and similar space heating systems.

The simplest or most elementary type of thermostatic temperature control employs a thermostatic switch which closes a circuit supplying power to the heat source when the temperature falls below a predetermined value, and shuts off the power to the heat source when the heat supplied has brought the environment of the thermostatic switch to another predetermined value. Conventional heating systems in general, however, continue to supply heat after the shutting off of power to the heat source. For example, the ordinary radiator of a hot water system obviously continues to supply heat to the temperature control space after the de-energization of the furnace or other heating apparatus, and a similar effect is obtained in hot air systems.

To correct the overshoot of temperature thus inherent in the simplest type of thermostatic switch control, it has long been conventional to employ in the thermostat structure an "anticipator." This is a small heating element which supplies heat directly to the thermostat when the thermostatic switch contacts are closed, so that the contacts are opened before the surrounding environment actually reaches the nominal shutoff temperature, thus "anticipating" the reaching of the desired temperature in the environment which actually occurs substantially after the opening of the contacts.

Although the use of the anticipator greatly diminishes the problem of overshoot due to continued heat transfer after shutoff, there nevertheless remains a substantial problem due to inability of the anticipator to properly perform the "anticipation" function over a large range of heat-demand conditions, owing to the effect, in each operating cycle, of residual heat in the thermostat due to the previous operating cycle. Where heat demand is low, as on a mild day, the entire thermostat structure may reach complete temperature equilibrium with its surroundings in the interval after each heating cycle. However, when the heat demand is high, so that the periodicity of the cycles is rapid, the heat introduced into the thermostat structure by the anticipator from the previous cycle is not completely dissipated. Under these conditions, the thermostat temperature at the time of the next closing of the contacts is actually above the surrounding temperature, and the thermostatic switch thus does not close until the surrounding temperature is substantially below the temperature at which it closes in the low-demand (low frequency of operation) situation.

Where an anticipator is employed, the opening of the contacts of the thermostatic switch occurs after a time which is substantially independent of environmental temperature, because the heat input from the anticipator heating element occurs at a rate such that the temperature rise of the thermostat after closing of the contacts is largely independent of the surrounding environmental temperature. Thus such a system operates with essentially the same duration of each "on" portion of its cycle, the cycling variation due to demand variation appearing as variation of the interval between the periodic "on" portions of the cycle, i.e., as variations of the duration of each "off" portion of the cycle.

When these factors of operation are considered, it will be seen that the use of the heat anticipator actually produces a shift of the temperature calibration of the thermostat with variations in demand, the temperature of the controlled space produced by the thermostat being lower under conditions of high demand than under conditions of low demand. This variation is further aggravated by the variations in temperature rise after shutting off of the heat source which likewise occur with heat demand. With small heat loss from the controlled space (conditions of low demand) the temperature rise produced after shutoff of the heat source is greater than is the case under conditions of high demand and high heat loss.

As a result of these factors, the heat anticipator thermostat systems now in common use are incapable of holding calibration under all conditions of demand. An adjustment provision is conventionally made for varying the heat input of the anticipator heating element for producing the degree of "anticipation" effect which is deemed optimum in each particular installation. This setting is generally selected as a compromise between the anticipator heat input power desirable for low-demand operation and high-demand operation, respectively, thus producing error in opposite directions under the two extremes of operating conditions.

The difficulties described above have heretofore been recognized, and attempts have been made to solve them. In general, this has been done by providing an auxiliary means to sense the heating demand, which controls the "anticipation" heat supply to the thermostat, as by an auxiliary heat anticipator varied in accordance with outside temperature or the plenum temperature of a hot air system. By provisions of suitable complexity, such devices of the prior art may be made to provide satisfactory performance, but only at substantial cost, and such devices of the prior art generally lack ready adaptability to conventional thermostatically controlled heating systems in common use.

The present invention lies, in its most general aspects, in an entirely different approach than those heretofore known. In the present invention, the turning on and off of the power to the heat supply is, as in the prior art, controlled by the switched contacts of the thermostat. However, in the present invention, the time relation between the opening and closing of the thermostatic switch contacts and the on and off conditions of the heat supply is altered in the coupling to the heat supply by means thermally independent of and external to the thermostat. In conventional systems, the thermostat contacts are connected with an ordinary relay which of course provides exact correspondence between the open and closed positions of the switch contacts and the off and on conditions of the supply of power to the heat source. In the present invention, this exact correspondence is eliminated, and the on-time of the heat source, although initiated by each cycle of operation of the thermostat contacts, is made variable with respect to the on-portion (closed time) of the thermostat cycle, and this relation is varied in accordance with the heat demand, the on-time of the heat supply being of greatest ratio to the closed time of the thermostat switch when the heat demand is high, and of least ratio to the closed time of the thermostat contacts when the demand is low. Thus the inadequacy or insufficiency of the anticipator to prevent overshoot at low demand is compensated by relative shortening of the period of heat source operation, while the opposite error produced at high demand by the anticipator is compensated by relative extension of the period of operation of the heat source, even though the closed time of the thermostat, itself, remains substantially constant.

There are of course a variety of ways in which the operation just describe may be obtained. However, in its narrower aspects, the invention provides a very simple form of apparatus for producing this mode of operation, not only low in cost, but in addition readily adapted to use in existing heating systems by assemblage in a single unit located near the heating apparatus and capable of being coupled thereto without the necessity of substituting thermostats or running additional leads to the existing thermostat. As one aspect of the invention, there is provided a simple modification structure which may readily be inserted in any existing control system.

It will be observed that although the present invention is of particular utility in connection with a thermostat of the type having an anticipator, thus producing more or less equal closed-contact times for all conditions of demand, it may also be used with substantial advantage with a simple uncompensated thermostat, since the lengthening and shortening of the heat supply on-time with respect to the closed contact time in itself tends to reduce temperature excursions with which the heat anticipator is designed to deal.

In the specific embodiment of the invention found most advantageous for adaptation to existing installations, a time-delay relay of the thermal type is substituted for the conventional relay normally in the circuit closed by the thermostat contacts. As is well known, a thermal-delay relay operates by energization of an internal heating element. When current is applied, the relay closes only after sufficient heat has been supplied to operate the output contacts. Upon withdrawal of power, the opening of the contacts is again delayed by the cool-down time. For any given time of application of input power, the time of operation of the output contacts may be varied, for example by variation of the input current. Thus variation of the input current supplied by the thermostat contacts may be employed if so desired. A suitable temperature sensitive resistance responsive to an environment indicative of heat demand, such as output temperature, may, if so desired, be placed in series with the thermal delay relay to produce the operation described above.

In the preferred embodiment illustrated in the drawing the variation of the closed-time of the thermal relay is accomplished by employing a bias current through the activating heater of the thermal relay, variable in accordance with the heating demand. This construction is preferably employed with a rectifier system, later to be described. which permits the assembly of a simple "universal" adapter construction which may readily be inserted in a variety of existing systems without the necessity of substantial design in selection of component values, etc., matching the electrical characteristics of particular thermostats and other elements of the existing circuit.

Although most commercial embodiments employing the principles of the invention will no doubt desirably employ automatic operation, as in the embodiments to be described, in principle, the method of the invention may be accomplished manually, as for example, by manual adjustment of the ratio of the on-time of the heat source to the closed time of the thermostat in accordance with a thermometer reading indicating the outdoor temperature and thus demand.

For better understanding of the invention, reference is made to the specific embodiment shown in the drawing, in which:

FIGURE 1 is a block diagram of a control system in accordance with the present invention, showing its cooperation with a conventional heating system;

FIGURE 2 is a schematic diagram of a particular control circuit constructed in accordance with the invention; and FIGURE 3 is a diagram illustrating the operation of the circuit of FIGURE 2, showing the timings for different heat demands relative to the thermostat operation.

Referring now to FIGURE 1, there is shown in highly schematic form a conventional heating system of the forced hot air type, including a furnace or heating apparatus 10, a plenum 12, and a duct 14 which connects the plenum to a room or controlled space 16, all illustrated in broken line. A thermostat 18, the housing of which is also illustrated in broken line, is located within the controlled space 16 and is responsive to the temperatures thereof. The thermostat 18 is of a well-known type having a bimetallic element 20 which moves with decreasing temperature to close the contacts 22 and 24 when the temperature is below the thermostat setting, the contacts 22 and 24 being connected in series circuit relation with a heat anticipator 26. (No mechanism for adjusting or setting the temperature at which the contacts close is shown, since mechanisms for this purpose are well known in the art and form no part of the present invention.) The thermostat produces an output 27 of pulses of substantially fixed duration, the pulse duration in each operating cycle being fixed by the resistance value of the anticipator 26 for a given control system voltage.

A temperature responsive device 28 is located within the plenum to be responsive to the average plenum temperature and may comprise a temperature responsive variable resistance element or any other device whose output 36 varies with its environmental temperature. The temperature responsive device 28 has a relatively high time constant so that it reacts slowly to temperature changes and thus to the average plenum temperature and not to the rapid changes that take place when the burner cycles. Because, as previously mentioned, the on-time frequency of the heating apparatus increases with heating demand, the average temperature in the plenum also increases, and thus the plenum temperature and sensor output are indicative of the heating demand.

A voltage source is applied to the control system at terminal 30 and this voltage is then applied to the contact 22 of the thermostat and to the temperature responsive device 28. (It is of course understood that no voltage necessarily need be applied to the temperature responsive device 28 where this device is of an active nature, such as a thermocouple, rather than being of a passive nature, such as a thermistor.)

The output 27 from the thermostat 18 is fed to a variable pulse-duration device 32 which provides "on/off" signals 34 of pulses corresponding one-for-one to the fixed duration thermostat output pulses, but varying in width or duration in accordance with the output 36 from the temperature responsive device 28, decreasing in pulse width with decreasing plenum temperatures and decreasing demand, and increasing in pulse width with increasing plenum temperatures and increasing demand. The variable duration output pulses are then fed to the heating apparatus 10, turning it on for the duration of each pulse, and in this manner the on-time of the heating apparatus is varied with the demand for heat. The variable pulse-duration device 32 may comprise any suitable relay or electronic circuit providing such variable pulse width control, or may, as in the particular circuit described in detail hereinafter, comprise a thermal time-delay relay.

It can now be seen that with the heat anticipator resistance value set, for example, to provide a thermostat closed time sufficiently long to provide adequate heat and proper heating system operation in fairly cold weather, in mild weather the on-time frequency of the furnace decreases, decreasing the average temperature of the plenum, and thus the temperature sensor output 36 causes the variable pulse-duration device 32 to shorten each of the pulses received from the thermostat by a suitable amount, and each on-time of the heating apparatus 10 will be of such shorter duration. With proper adjustment of the relative range of on-time variations corresponding to any particular range of plenum temperatures, as by proper selection of component characteristics by simple experiment or design, the decrease in on-time in mild weather with low heat demand will cause the heating apparatus to equalize the temperature of the controlled space 16 to precisely that of the thermostat setting; and variations in the weather, causing changes in heat demand will result in appropriate corresponding changes in the heating cycle on-time, to prevent the temperature in the controlled space from overshooting or falling short of the thermostat setting.

There is shown in FIGURE 2, the wiring diagram of a particular control circuit constructed in accordance with the present invention, utilizing a thermal time-delay relay to vary the duration of the on-time of each operating cycle. A thermostat 40, like that described in connection with FIGURE 1, is shown having a bimetallic element 42, contacts 44 and 46 which are adapted to close when the thermostat temperature is below its set value, and a heat anticipator 48 connected in series with the thermostat contacts 44 and 46, the series combination being connected across thermostat terminals 50 and 52. The heat anticipator 48 functions in the same manner as that described in connection with the heat anticipator 26 of FIGURE 1. Connected in shunt with the thermostat terminals 50 and 52 is a thermistor 54 connected in series with a rectifier 56, the thermistor being located in the plenum or duct of the heating system and having a fairly large mass and high thermal time constant to be responsive only to the average plenum temperature and a high dissipation constant to avoid self-generation of heat. The parallel combination of the thermostat 40 and the series connected thermistor and rectifier, 54 and 56, is wired in series with the heater element 57 of a thermal time-delay relay 58 and a source of low voltage alternating current applied at terminals 60 and 62, as shown. Connected in shunt with the heater 57 of the delay relay is a series circuit combination of a load resistor 64 and a rectifier 66, the rectifiers 56 and 66 being poled oppositely to each other for reasons which will hereinafter be explained in connection with the circuit operation.

The thermal time-delay relay 58 is of a well known construction, having a bimetallic member 68 fixedly mounted at one end 69 within a vacuum enclosure 70 and a contact 72 mounted on the other end and moved by the bimetallic element 68 into and out of engagement with a stationary contact 74 on heating and cooling of the element 68 to predetermined temperatures. The "make" and "break" of the contacts 72 and 74 close and open the power circuit to the heating apparatus 80 which is connected in series with the delay relay terminals, 82 and 84, and a source of power, as shown. The power connection to the heating apparatus 80 is shown highly schematically, but it is understood that control of its operation may be accomplished in any number of well known ways, as for example, by controlling a gas valve, an oil burner, an electric heater, etc., depending on the nature of the heating apparatus, or such control may be effected by the use of additional relays which in turn control the heating apparatus.

In operation, the thermostat 40 operates in the same manner as that described in connection with FIGURE 1.

The heat anticipator 48 is set to provide a closed time of the thermostatic switch of, for example, two minutes. This length of closed contact time may be that generally used in many conventional thermostatically controlled heating systems, not controlled in accordance with the present invention, to provide adequate heating in fairly cold weather. The thermostat closed time is represented by the pulse length which appears across terminals 50 and 52, and is shown as the pulse 90 in FIGURE 3.

During the "off" or open condition of the thermostat contacts 44, 46, a continuous D.C. bias current flows from the terminal 60 through the thermistor 54, the rectifier 56, and the relay heater 57, to the terminal 62, the terminals 60, 62 having typically a source of 24 volts A.C. applied thereto. The magnitude of this current is determined primarily by the resistance of the thermistor 54 (which in one specific construction has a resistance of 250 ohms at 25° C., other components being specified parenthetically hereinafter) and the heater 57 of relay 58 (which may be, for example, an Amperite 26NO45). Since the thermistor resistance varies with its temperature, i.e., increasing with decreasing temperatures and decreasing with increasing temperatures, and the heater resistance is more or less constant in comparison, the magnitude of the bias current varies with the thermistor temperature and the average temperature of the plenum. Since the average plenum temperature increases with the demand as previously discussed, the bias current also varies with demand, increasing with increases in demand and decreasing with decreases in demand. The bias current causes the relay heater 57 to increase the temperature of the bimetallic element 68, but not sufficiently to cause the contacts 72 and 74 to close, although the highest point in the range of variability of the bias current may bring the temperature substantially near the closing point.

When the temperature of the controlled space drops below the thermostat setting, the thermostat essentially shorts out the thermistor resistance (the resistance of the anticipator 48 being typically 1 ohm or less), increasing the current from the A.C. source at terminals 60, 62, through the relay heater 57 to increase the temperature of the bimetallic element 68 to or beyond the closing temperature. The increase in current through the relay heater 57 on closure of the thermostat contacts is sufficient to close the relay contacts 72, 74, after a delay depending primarily on the value of bias current flowing just prior to the closing of contacts 44, 46. The principal factor in determining the duration of the on-time portion of each operating cycle of the heating apparatus is this variable delay between the closing the thermostat contacts 44, 46 and the closing of the relay contacts 72, 74. When the bias current is at a relatively low value, corresponding to a low demand, the delay is relatively long, as shown by the time interval $t_2-t_0$ of pulse 92 in FIGURE 3, which for example may be typically 45 seconds. With increasing demand for heat, and thus rising plenum temperatures, the bias current increases. For a very high demand, the temperature of the bimetallic element 68 is raised almost to the closing temperature by the bias current, and thus the delay in the closing of the contacts 72, 74 is decreased to a very small value, as represented by the time interval $t_4-t_0$ of the pulse 94 in FIGURE 3.

In addition to the variable principal delay, the variability of the duration of the on portion of each operating cycle is augmented by a secondary variable delay between the opening of the thermostat contacts and the opening of the relay contacts. This secondary delay is primarily determined by the magnitude of the bias current immediately subsequent to the opening of the thermostat contacts and the resistance to heat loss of the delay relay. The heat generated by the relay heater decreases with the drop in current from the thermostat closed condition to the thermostat open condition. The greater the drop in current, i.e., to a lower bias current, the shorter will be the time necessary for the bimetallic element 68 to cool to the temperature at which the contacts 72, 74 open. But even at a low demand and low bias current, there will generally be some short delay, as represented by the time intervals $t_3-t_1$ of the pulse 92. When the demand is high, the bias current will also be high and the drop in heater current will be smaller, producing a somewhat longer delay before the relay contacts open, as represented by a time interval $f_5-f_1$ of the pulse 94. Although the variations and magnitudes of the secondary delays are shown to be substantially smaller than those of the primary or principal delays, this relationship may vary in any particular system and depends primarily on the characteristics and construction of the specific delay relay utilized in the circuit. The total range of variability of each on-time pulse is then the combined effect of the primary and secondary delays, the former decreasing with increasing demand, and the latter increasing with increasing demand. This range of variability may be from some value substantially shorter than the thermostat closed time to some value longer than the thermostat closed time, the maximum duration obtainable depending primarily on the component characteristics.

An additional effect produced in the operation of this system, utilizing a thermal delay relay of the type described, which further augments the variability of the on-time duration with changes in demand, although generally to a smaller extent than the phenomena just described, is that produced by the retained heat of the relay 58 itself. That is, when the operating frequency increases over some period in response to a greater demand, the relay heater 57 will be generating its maximum heat for a greater cumulative time during this period. The retained heat within the relay 58 causes the average temperature of the bimetallic element to rise so that when the thermostat contacts close, the relay contacts close sooner than otherwise. Thus, the tendency for heat build-up within the thermostat by the frequent heat anticipator operation when there is high demand, as previously mentioned, which tends to prevent the system from equalizing the room temperature to the thermostat setting also takes place within the thermal time delay relay where it is in the direction to offset this adverse effect of the heat anticipator.

The amount of variation of the duration of the on-time from minimum to maximum produced by the variations in average plenum temperature of any particular heating system to provide compensation for that system is determined by simple experiment, and the proper selection of component characteristics, such as the thermistor temperature coefficient and the rated relay delay time, is made accordingly.

The employment of the shunt resistor 64 and the rectifiers 56 and 66 permit the circuit of FIGURE 2 to be adapted to many existing systems in which a predetermined current must be drawn through the anticipator for thermostat and anticipator operation in accordance with the rated specifications and calibration of the thermostat unit. Generally it will be found that the resistance of the heating element 57 is too great to draw the necessary current through the anticipator 48, and thus the resistor 64, having a value chosen accordingly, is connected in shunt therewith (being 25 ohms in the specific construction hereinbefore mentioned). To prevent the load resistor 64 from drawing current through the thermistor 54, the excess loading of which would cause self-generation of heat, the rectifiers 56 and 66 are provided in circuit with the load resistor and the thermistor, opposited poled as shown in FIGURE 2, thus blocking the loading current from the thermistor branch, but allowing the load resistor to operate when the thermostat contacts are closed and the heat anticipator is connected to the low voltage source. The system according to the invention may readily be installed in many conventional heating systems with the substitution of the thermal time-delay relay for the low voltage switching relay commonly used to control the furnace operation and the components may readily be assembled in a single unit which may be conveniently located near the furnace with the thermistor disposed within the plenum. The unit may then be connected to the existing thermostat leads and A.C. voltage source, and the load resistor 64 adjusted to permit normal thermostat operation.

In the specific embodiment described, the delay control between the operation of the thermostat and the operation of the heating apparatus is accomplished by a temperature sensing thermistor. However, it will readily be appreciated that, in principle, the delay may be controlled by manually varying a suitable potentiometer substituted for the thermistor in response to some indication of changes in demand. Also, it will be appreciated that there are many other available ways of sensing the heat demand. For example, variation of the heat supply input may, if so desired, be performed in response to the frequency of operation of any portion of the system, this frequency itself being indicative of the heat demand without the necessity of any auxiliary temperature sensing device.

Although the control system according to the present invention has been described in conjunction with a hot air heating system, it is understood that its use is not so limited, but may be used to control heating systems of other types such as those using hot water as the heating medium, or electric heating elements, etc. Also the present invention may be advantageously used in conjunction with forced air systems of the type wherein the blower speed is varied with the plenum or duct temperature, one such system being described in U.S. Patent 2,838,243, issued June 10, 1958. Furthermore, the present invention with suitable modification may be utilized to control cooling systems as well.

The embodiments of the invention illustrated in the drawing and described above will suggest to persons skilled in the art a number of variations and modifications, some being immediately obvious and others obvious upon study from the basic teachings of the invention. Therefore, the scope of the protection to be afforded the invention should not be limited by the particular embodiments shown and described, but should be determined in terms of the definitions of the invention set forth in the appended claims, and equivalents thereof.

What is claimed is:

1. In a temperature-control system of the type having a thermostatic switch adapted to respond to the temperature of a space to be controlled and means for coupling the switch to heat-transfer apparatus for on-and-off repetitive cycling thereof in response to corresponding cycling of the switch to maintain a preset temperature, the proportion of closed-contact time to open-contact time of the switch in such cycling varying with the average heat-transfer demand thus supplied and the switch being of the type having its operating-point affected by the time since previous operation, sensing means independent of the thermostatic switch for deriving an output indicative of the average heat-transfer demand, and compensating means responsive to the sensing means for reducing variation of the preset temperature in said space at a given thermostat setting with variation of said proportion, the improvement wherein the coupling means comprises means thermally isolated from the thermostatic switch and responsive to each operation thereof for producing a corresponding output cycle of variable on-time, and the compensating means comprises means responsive to the sensing means for altering the relation of the on-time of the the output cycle of the coupling means to the closed-contact time of the switch with increasing and decreasing heat-transfer demand and variation of such proportion.

2. The system of claim 1 further comprising an anticipator heating element closely adjacent to the thermostatic switch and in circuit therewith, the anticipator producing a repetitive thermostatic switching cycle of substantially constant closed-contact time but of open-contact time varying in accordance with the heat transfer demanded for maintaining constant temperature in said space, and said coupling means comprising means responsive to the compensating means and to the thermostatic switch for varying the ratio of each on-time of the output cycle of the coupling means to the closed contact time of the thermostat to compensate for variation in differential between the temperature of said space and the temperature of said switch with variation in demand.

3. The system of claim 1 wherein said coupling means includes variable means for delaying the on portion of said output cycle for a period of time after the closure of said thermostatic switch, and said compensating means comprises means responsive to the sensing means for varying said period in accordance with the heat-transfer demand.

4. The system of claim 1 wherein said coupling means includes variable means for delaying the on portion of said output cycle for a first period of time after each closure of the thermostatic switch, and variable means for delaying the off portion of said output cycle for a second period of time after each opening of the thermostatic switch, and said compensating means comprises means responsive to the sensing means for decreasing said first period and increasing said second period with increasing heat-transfer demand.

5. The system of claim 1 wherein said coupling means comprises a heating element thermally isolated from said thermostatic switch but being in circuit therewith, said circuit including output means for coupling a current source thereto, a second thermostatic switch having predetermined closing and opening temperatures being thermally responsive to the heating element and including means adapted to switch power on and off to the heat-transfer apparatus, and said sensing means being electrically coupled to said heating element and comprising variable means for providing a bias current thereto which varies with heat-transfer demand, so that the duration of each on-portion of the heat-transfer cycle is varied with heat-transfer demand.

6. The system of claim 5 wherein said sensing means comprises a temperature responsive variable resistance device adapted to be placed in an environment having temperature indicative of the heat-transfer demand, said system further comprising first circuit means including a current source connected in series with the heating element and the variable resistance device for providing a bias current to the heating element which varies with heat-transfer demand but has a maximum insufficient to cause heating of the second thermostatic switch to its closing temperature, and second circuit means including a current source connected in series with said first thermostatic switch and said heating element for providing current to the heating element sufficient to cause heating of the second switch to its closing temperature after a delay from the closing of the first switch, whereby the delay decreases with increasing bias current flowing just prior to the closing of said first switch.

7. The system of claim 6 further comprising means for maintaining said second switch closed after the first switch opens for a second delay which increases with increasing bias current flowing at the time the first switch opens.

8. The system of claim 6 wherein said first and second circuit means comprise a common current source, said system further comprising an anticipator closely adjacent to said first thermostatic switch and in series circuit therewith, loading means in circuit with said heating element for providing a predetermined current through the anticipator when said first switch is closed, and means for inhibiting the current drawn by said loading means from flowing through said variable resistance device.

9. A compensating circuit for use with a temperature-control system of the type having a thermostat unit including an anticipator in circuit with a thermostatic switch, and means for coupling the thermostat unit to heat-transfer apparatus for on-and-off repetitive cycling thereof, comprising:

(a) a thermal delay device comprising a heating element adapted to be electrically connected to a current source and to the thermostat unit, and a switch thermally responsive to the heating element for operation after a delay and being adapted to control the power to the heat-transfer apparatus, (b) a variable resistance device adapted to be responsive to a temperature indicative of heat-transfer demand having means for coupling the source to said heating element for varying said delay in accordance with demand so that the duration of on-time of said switch is increased and decreased with increasing and decreasing demand, (c) loading means in shunt with said heating element for providing a predetermined current to the thermostat unit, and (d) means in circuit with said loading means and said variable resistance device for inhibiting the current drawn by said loading means from flowing through said variable resistance device.

10. A compensating circuit according to claim 9 for use in control systems supplied by an A.C. source, wherein said last mentioned means comprises a first unidirectional current device in series with said loading means and a second unidirectional current device in series with said variable resistance device, said first and second unidirectional current devices being oppositely poled.

References Cited

UNITED STATES PATENTS

| 2,301,708 | 11/1942 | Roessler | 236—68 |
| 2,339,618 | 1/1944 | Crago | 236—9 |
| 2,425,998 | 9/1947 | Crise | 236—68 X |
| 2,659,534 | 11/1953 | Smith | 236—9 |
| 2,932,456 | 4/1960 | Deubel | 236—68 |
| 3,167,251 | 1/1965 | Kriechbaum | 236—68 |

ROBERT A. O'LEARY, *Primary Examiner.*

W. E. WAYNER, *Assistant Examiner.*